(12) United States Patent
Choi et al.

(10) Patent No.: US 7,362,750 B2
(45) Date of Patent: Apr. 22, 2008

(54) SWITCH MODULE ARCHITECTURE

(75) Inventors: Kam Choi, Tring (GB); Eugene O'Neill, Castleknock (IE); Edele O'Malley, Ashtown (IE)

(73) Assignee: 3Com Corporation, Marlborough, MA (US)

( * ) Notice: Subject to any disclaimer, the term of this patent is extended or adjusted under 35 U.S.C. 154(b) by 1023 days.

(21) Appl. No.: 10/464,292

(22) Filed: Jun. 17, 2003

(65) Prior Publication Data

US 2004/0218597 A1 Nov. 4, 2004

(30) Foreign Application Priority Data

Apr. 29, 2003 (GB) .................. 0309688.0

(51) Int. Cl.
*H04Q 11/06* (2006.01)
(52) U.S. Cl. .............. 370/369; 370/386; 370/392
(58) Field of Classification Search ............ 370/229, 370/395.5, 434, 401, 395, 347, 238, 389 370/392, 218, 311, 312, 369
See application file for complete search history.

(56) References Cited

U.S. PATENT DOCUMENTS

| | | | |
|---|---|---|---|
| 5,124,978 A | 6/1992 | Chao | |
| 5,255,265 A * | 10/1993 | Eng et al. ............ | 370/416 |
| 5,267,235 A * | 11/1993 | Thacker ............... | 370/396 |
| 5,754,532 A * | 5/1998 | Dev et al. ............ | 370/250 |
| 5,892,932 A * | 4/1999 | Kim .................... | 710/316 |
| 5,940,596 A * | 8/1999 | Rajan et al. ......... | 709/242 |
| 6,078,963 A * | 6/2000 | Civanlar et al. ..... | 709/238 |
| 6,125,112 A | 9/2000 | Koning | |
| 6,263,393 B1 * | 7/2001 | Funaya et al. ....... | 710/316 |
| 6,324,165 B1 | 11/2001 | Fan et al. | |
| 6,400,730 B1 | 6/2002 | Latif et al. | |
| 6,501,761 B1 * | 12/2002 | Pannell et al. ....... | 370/403 |
| 6,801,950 B1 * | 10/2004 | O'Keeffe et al. .... | 709/238 |
| 6,999,452 B1 * | 2/2006 | Drummond-Murray et al. ............ | 370/389 |
| 7,164,863 B2 | 1/2007 | Lange et al. | |
| 2003/0026287 A1 * | 2/2003 | Mullendore et al. ...... | 370/442 |
| 2003/0118021 A1 * | 6/2003 | Donoghue et al. ....... | 370/392 |
| 2003/0193938 A1 * | 10/2003 | Ayandeh ............... | 370/386 |
| 2003/0210685 A1 * | 11/2003 | Foster et al. .......... | 370/389 |

(Continued)

FOREIGN PATENT DOCUMENTS

GB 2336074 10/1999

(Continued)

OTHER PUBLICATIONS

Bagheri, Mehran, Denis T. Kong, Wayne S. Holden, Fernando C Irizarry, and Derek Mahoney, "An STS-N Byte-Interleaving Multiplexer/Scrambler and Demultiplexer/Descrambler Architecture and its Experimental OC-48 Implementation," IEEE?ACM Transactions on Networking, vol. 1, No. 3, Jun. 1993.

*Primary Examiner*—Ricky Q. Ngo
*Assistant Examiner*—Ankit P Gandhi

(57) ABSTRACT

A switching module has external ports for sending and receiving data packets and mesh interfaces for internal mesh connections with other modules. A switching engine directs packets to one or other of the mesh interfaces according to the port number of a 'destination' or egress port on another module, as determined by a lookup. The port numbers are programmable so that the distribution of traffic through the mesh connections can be modified.

4 Claims, 11 Drawing Sheets

U.S. PATENT DOCUMENTS

2004/0151195 A1 8/2004 Donoghue
2006/0007859 A1* 1/2006 Kadambi et al. ........... 370/229

FOREIGN PATENT DOCUMENTS

| GB | 2336075 | 10/1999 |
| GB | 2 344 032 | 5/2000 |
| WO | WO 97/19407 | 5/1997 |

* cited by examiner

SWITCH MODULE ARCHITECTURE

FIELD OF THE INVENTION

This invention relates to communication networks and particularly packet-based communication networks. More particularly the invention relates to a switch module which can be used with other similar switch modules to constitute a switching device in a variety of selectable ways.

BACKGROUND OF THE INVENTION

A modern architecture for a network switch comprises a multiplicity of modules, typically each provided on a respective silicon chip, wherein each module has a receiving section for processing data packets received on a multiplicity of ports, a switching section, which transmits those packets on one or other of a multiplicity of links, usually called 'mesh' links, and a transmitting section, which is connected to receive packets from a multiplicity of mesh links and provides for transmission of packets on one or other of a multiplicity of output ports. In a typical example, the switching section can direct packets to any one of four mesh links and the transmitting section can receive packets from any one of four mesh links.

One way of connecting such modules to form in effect a single switch is to connect one mesh link per module to the transmitting section of the same module and to connect each of the other three mesh links to a transmitting section in each of the other three modules. Although such a configuration is useful, it is not the only configuration in which a plurality of modules could be disposed.

An important restriction on the versatility of switching modules of this general character arises by virtue of the limited bandwidth of a mesh link compared with the total bandwidth available through the external ports of a module and the association of particular ports with a respective mesh link.

In an ordinary switch, a received data packet is usually subjected to an address look-up, wherein selected address data, which may be a media access control destination address or a network destination address is used to access a corresponding entry in a look-up table in order to obtain forwarding data for use by a switching engine. The forwarding data customarily includes a port number identifying an egress port from which the packet must be forwarded. The numbering or ID of the egress port will determine the mesh link to which the packet is directed. The look-up table can be at least partly established (as is well known) by making entries identifying, in each case an (ingress) port number with the source address of a packet received at the respective port.

SUMMARY OF THE INVENTION

The basis of the present invention is to allow the port numbers to be programmable. Such a facility allows different selections of ports to be associated with the mesh links and allows a more versatile and efficient use of the mesh links and the total theoretical bandwidth.

Further features and advantages of the invention will become apparent from the following description with reference to the accompanying drawings.

DETAILED DESCRIPTION

Figure 1:
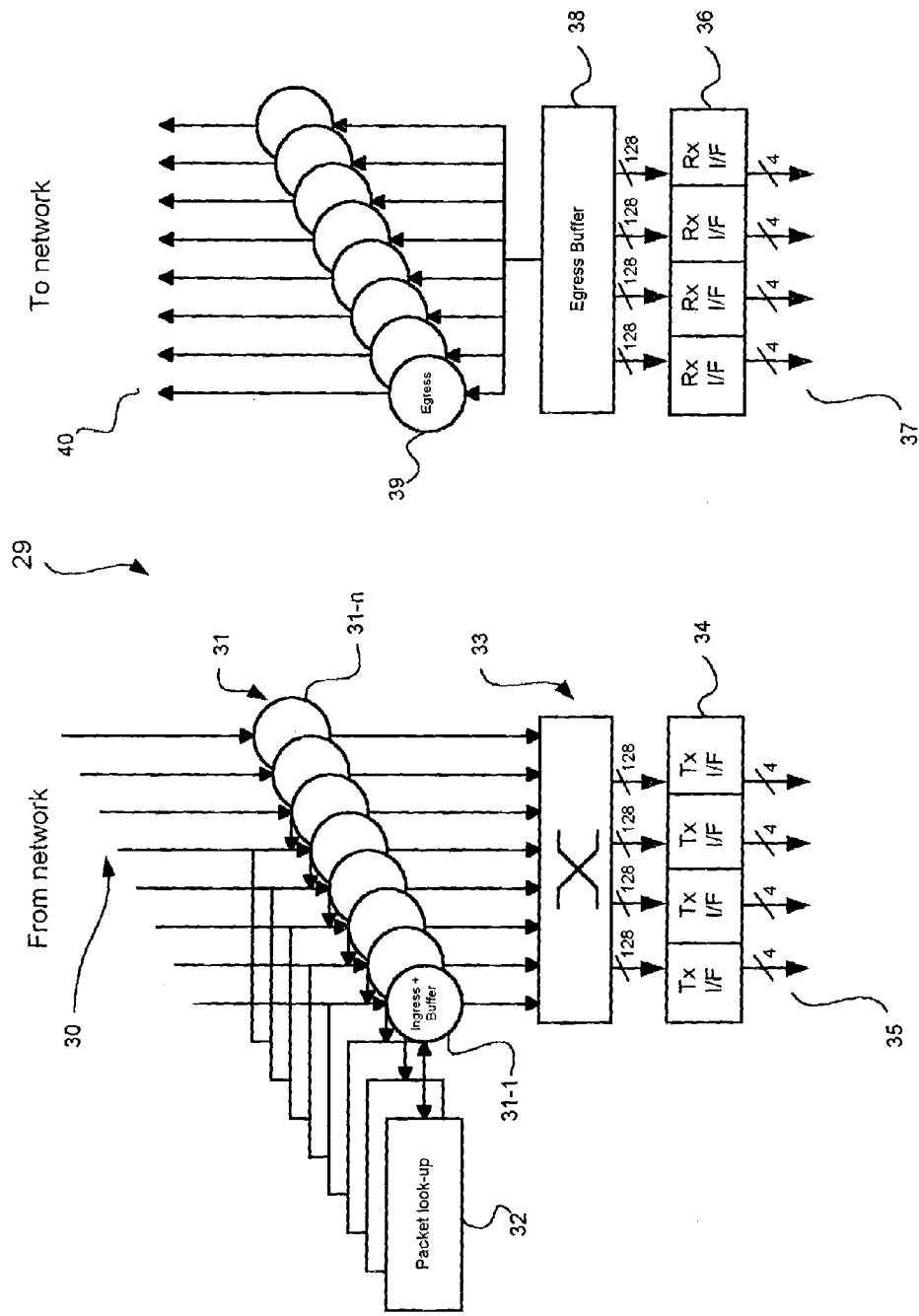
FIG. 1 illustrates schematically one example of the architecture of a switch module for use in the present invention.

FIG. 1 illustrates a switch module. This is preferably though not essentially constituted on a single chip. FIG. 1 illustrates a single module; how the modules may be combined will be explained with reference to later Figures.

It should be understood that there is a variety of different architectures available for the switch module 29 shown in FIG. 1. In this example it comprises a receiving section, which receives packets from a multiplicity of ports denoted 30, coupled to input processors 31-1 to 31-n. The module performs look-ups 32 for the received packets. These look-ups may be performed in a customary manner and will normally comprise employing address data as a key in a search engine which will retrieve forwarding data for the respective packet from a look-up database. The packets (and status words which include the forwarding data) are sent to a switching core 33. The core 33 will direct packets in accordance with their intended destination ports to one or other of a multiplicity of transmit (Tx) interfaces 34 each of which can provide data on a respective mesh link 35. A specific example of an interface 34 is described below with reference to FIG. 3. In this example there are four interfaces, each of which provides a transition for the data from a comparatively low frequency clock domain and a comparatively wide parallel form (e.g. 128 bits) to a higher frequency clock domain and provides data in a narrower form such as on four parallel lines. Such a transition in width is desirable because otherwise the terminal or 'pin' requirements become too great for practical implementation.

As will be clear later, the interfaces, and thus the mesh links, are associated in the switching core with predetermined ranges of port numbers. Thus ports 0-31 may be associated with a first interface, ports 32-63 with a second interface and so on.

The switch module also has a transmit section which includes receiving (Rx) interfaces 36 (four in this example) each of which receives serial data on each of four mesh links 37 (which may or may not be, depending on the configuration, the same as mesh links 35). The interface 36 provides wider parallel data at a lower clock frequency to an egress buffer 38 which provides outputs to egress processors 39 each of which is coupled to a respective output port in a set of output ports 40. Each port 30 may be combined with a port 40 as a duplex port. The processors 39 perform the conventional processing of packets required before they are transmitted from the output ports 40 in accordance with the appropriate transmission standard. One of the interfaces 36 is described below with reference to FIG. 4.

Figure 2:
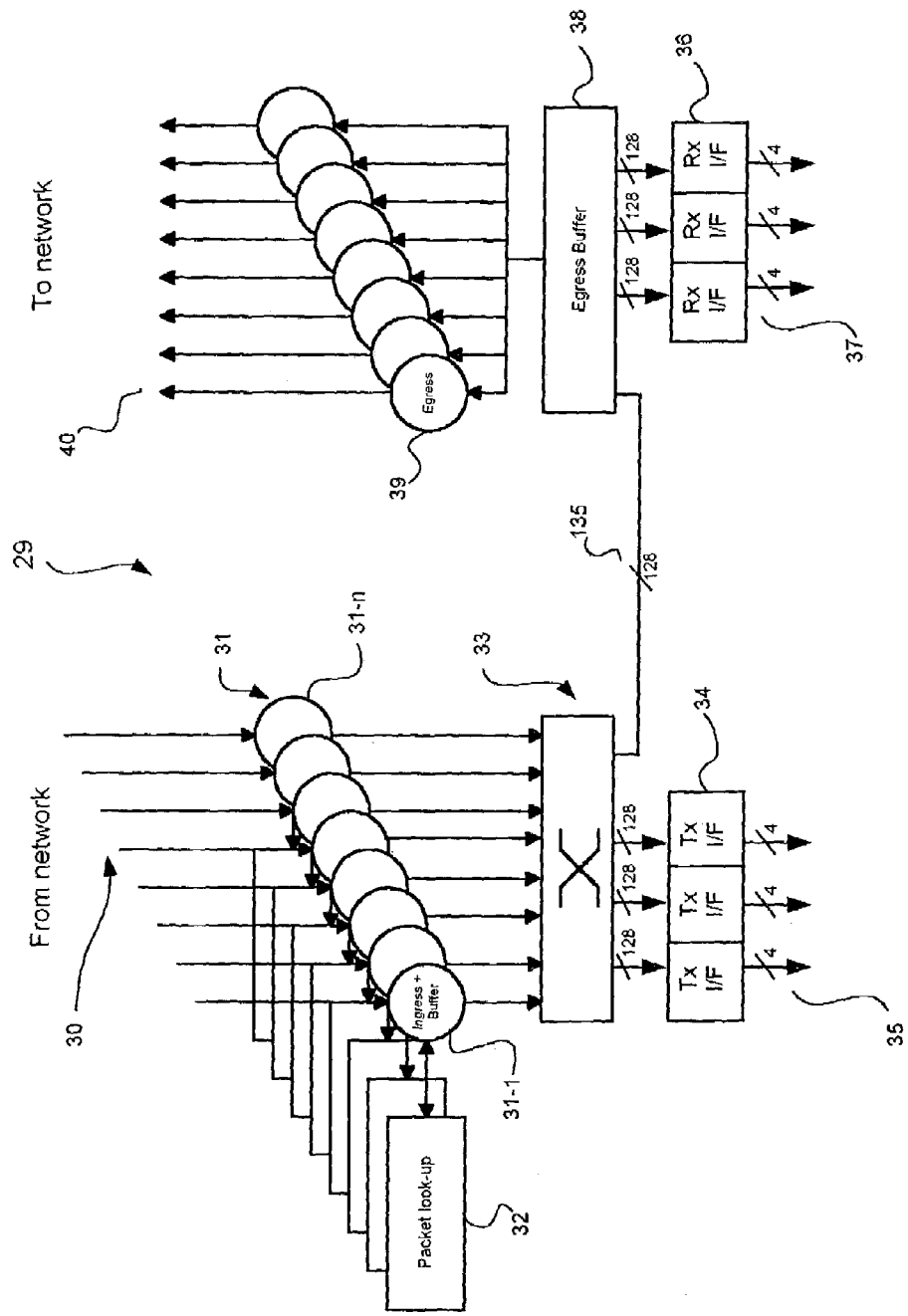
FIG. 2 illustrates schematically another example of the architecture of a switch module for use in the present invention.

As will be apparent later, it is usually necessary to provide a link between the receiving section of a switch module and the transmit section. For the switch module shown in FIG. 1, this may be achieved by connecting one of the mesh links 35 to the one of the Rx interfaces 36. However, as shown in FIG. 2, which otherwise resembles FIG. 1, one of the Tx interfaces 34 and one of the Rx interfaces 36 may be omitted and the connection between the sections of the switch may be constituted by an internal, full width (e.g. 128-bit) path 135.

Figure 3:
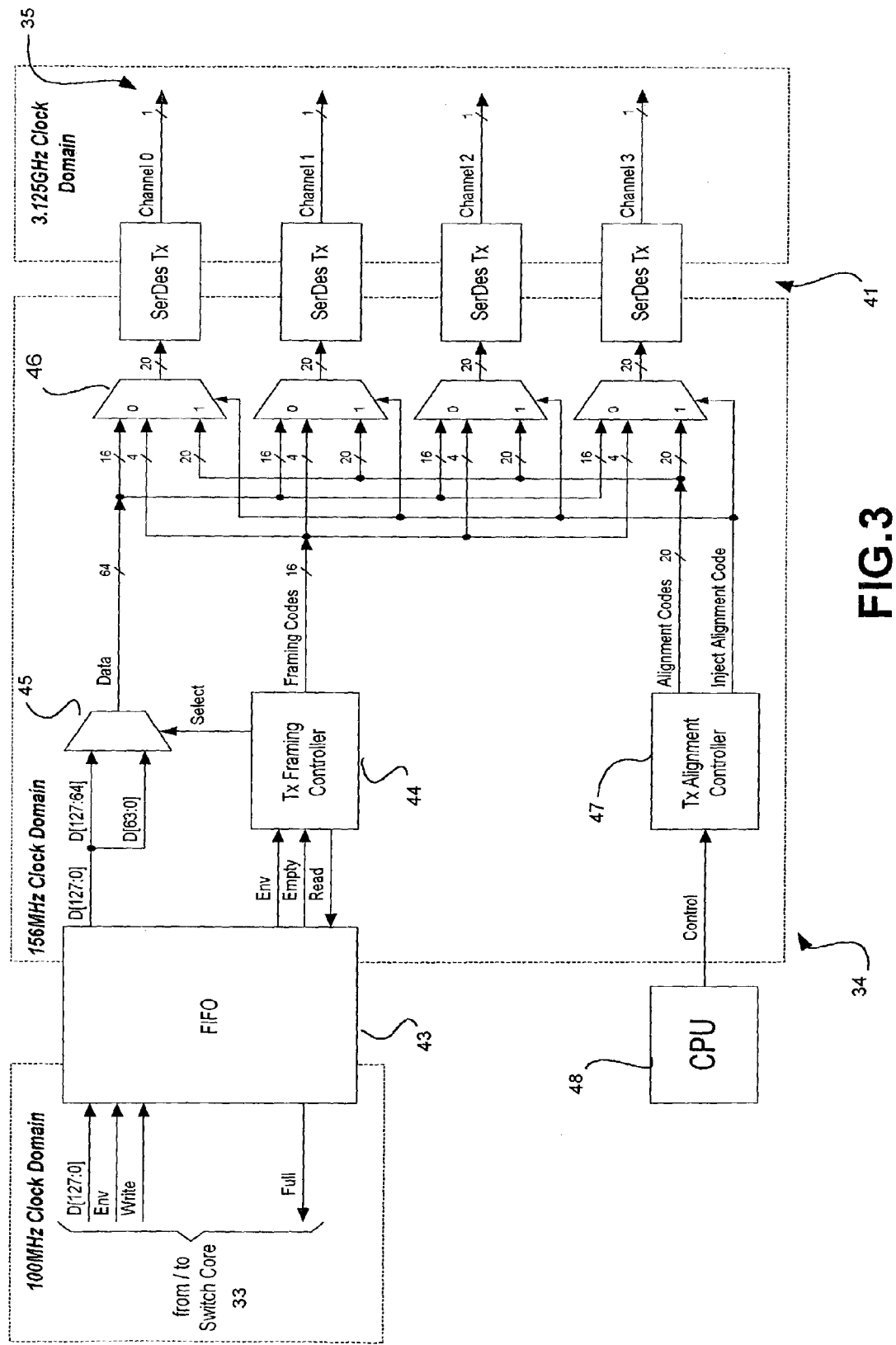
FIG. 3 illustrates an output mesh interface of a switch module.

FIG. 3 illustrates a transmit interface 34 in greater detail.

In order to reduce substantially the comparatively large width of the parallel data (in this embodiment 128 bits) provided by the switching core for possible transmission over a mesh link, the interface 34 employs serialisers. In this example each link has a multiplicity of channels (four channels) each including a serialiser 41. In this example the serialisers are constituted by the transmit (Tx) sections of commercially available serialiser/deserialisers ('serdes') of which the receive sections constitute the deserialisers 42 shown in FIG. 4. The transmit section of each serdes has a 20-bit parallel input interface running at 156 MHz, and a single serial output interface running at 3.125 Gbps. The receive section has a single serial input interface running at 3.125 Gbps, and a 20-bit parallel output interface running at 156 MHz. Such devices are commercially available as separate ASICs or as 'cores' that can be embedded within an ASIC.

The interface 34 needs therefore to cope with a clock-speed transition between the switching core 33 and the link serdes 41, a data-bus width difference between the switching-core and the link serdes 41, a transfer of the packet-lookup results and an indication of the start and end of a packet on the link.

In this embodiment the clock domain of the switching core is at 100 MHz, and the (higher frequency) clock domain of the mesh links is at 3.125 GHz.

The clock-speed transition between the switching-core 33 and the link serdes 41 is handled by means of a FIFO 43. The switching core can write to the FIFO faster than data can be sent onto the link, so the FIFO can provide a 'Full' signal to inform the switching core 33 that it must pause the writing of packet data to the FIFO 43. The switching-core 33 only begins writing to the FIFO 43 when it has a full packet, so the FIFO 43 can never become empty half way through a packet. 'Env' is an envelope signal for the packet, indicating that the FIFO word contains valid packet data. Env goes high for the duration the packet. The first 128 bits of the 'packet' constitutes a status word which contains the packet-look-up results, and the exact length of the packet (which may not coincide with a 128-bit boundary). In this example data is supplied to the FIFO 43 from the switching core in 128-bit wide parallel form.

A Tx Framing Controller controls writing of data to the serialisers (serdes) 41. Upper and lower sixty-four bits of the FIFO are alternately written to the link by way of a multiplexer 45 of which the select line is controlled by controller 44. The 64 bits of data is split into 4*16-bit paths and is sent on each of the four serdes 41 by way of multiplexers 46 controlled by a Tx alignment controller 47 configured by CPU 48. The spare 4*4 bits of the serdes are used to send framing, codes. The framing codes contain the framing characters ENV (envelope—effectively the signal Env) and IDLE (between packets).

Figure 5:
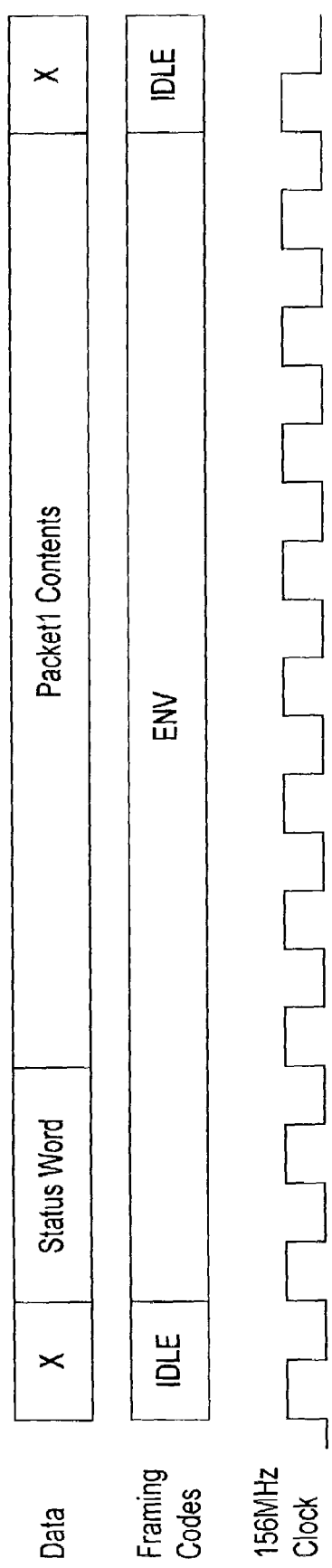
FIG. 5 is a timing diagram.

FIG. 5 shows how the framing characters are used for the transmission of a 64-byte packet (preceded by a 128-bit Status Word). The Tx framing controller 44 generates the framing code ENV for the packet (including Status Word) and IDLE for the gap between packets.

The Tx alignment controller 47 also allows a 20-bit 'alignment code' to be sent on the high-speed links in place of the normal transmitted data. These codes can be used by the receive section (FIG. 4) to align data on the high-speed link.

As noted above the serdes are serial encoder and decoder devices. The transmit side has a 20-bit parallel input interface running at 156 MHz, and a single serial output interface running at 3.125 Gbps. The receive-side has a single serial input interface running at 3.125 Gbps, and a 20-bit parallel output interface running at 156 MHz. Such devices are commercially available as separate ASICs or as 'cores' that can be embedded within an ASIC.

Figure 4:
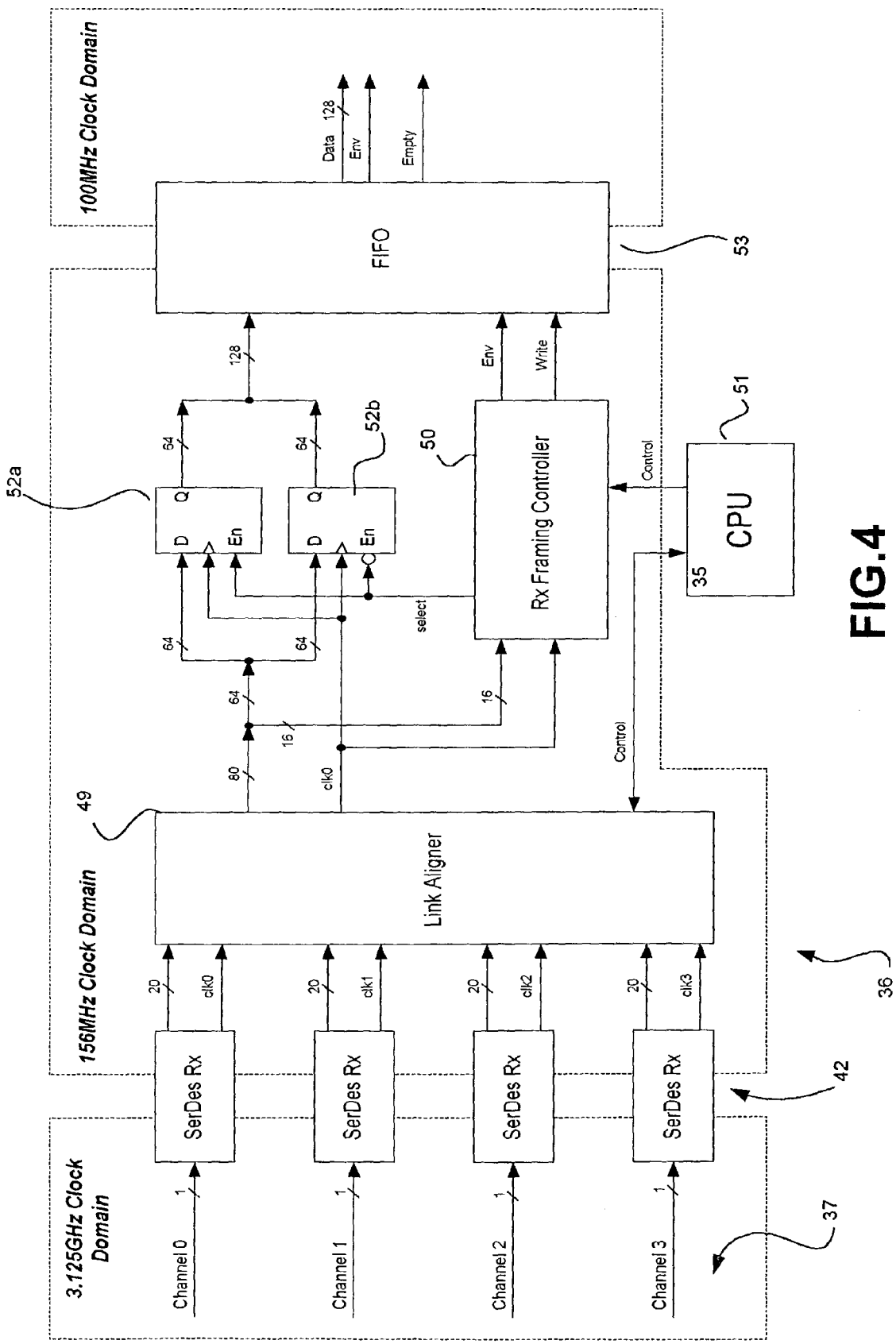
FIG. 4 illustrates an input mesh interface of a switch module.

FIG. 4 illustrates one example of an Rx interface 36 which receives signals on one of the high-speed mesh links. In practical terms it needs to provide temporal alignment of each link, regeneration of the Env signal (which indicates the start and end of packet), accommodation of a data-bus width difference between the link serdes and the internal blocks (such as the egress buffer) and a corresponding clock-speed transition.

There are two alignment problems for data received on the serdes: bit rotation of data within a serdes channel, and clock offset between the channels. The 20 bits of data output by each of the serdes might be arbitrarily rotated. This means that bits [0:19] output by the serdes could correspond to bits [N:19] of one 20-bit word and bits [0:N-1] of the next 20-bit word. One mechanism to overcome this bit-rotation is to characterise the channel initially by sending a known 'alignment code'. The link aligner 49 can then select the appropriate bits from consecutive 20-bit words to compensate for the bit-rotation. The clocks output by the Rx serdes will have the same frequency (because the serial signals originate from the same clock source) but may have relative phase delays. There are known techniques to eliminate the phase delays and resynchronise the channels to one clock (clk0): examples are described in GB-A-2336074 and GB-A-2336075.

An Rx framing controller 50 controlled by a CPU 51 regenerates the Env signal from the framing codes. The Rx framing controller also co-ordinates by means of 64-ply sets of D-bistables 52a and 52b the de-multiplexing of 64-bit data words into 128-bit data words before they are written into a FIFO 53. The clock-speed transition between the serdes (156 MHz) and the egress buffer (100 MHz) is handled by the FIFO 53. There is no danger of the FIFO 53 overflowing because the egress buffer is able to read from the FIFO 53 faster than the Rx framing controller 50 is able to write to the FIFO, because 128-bit words are written on every other cycle of the 156 MHz clock.

Figure 6:
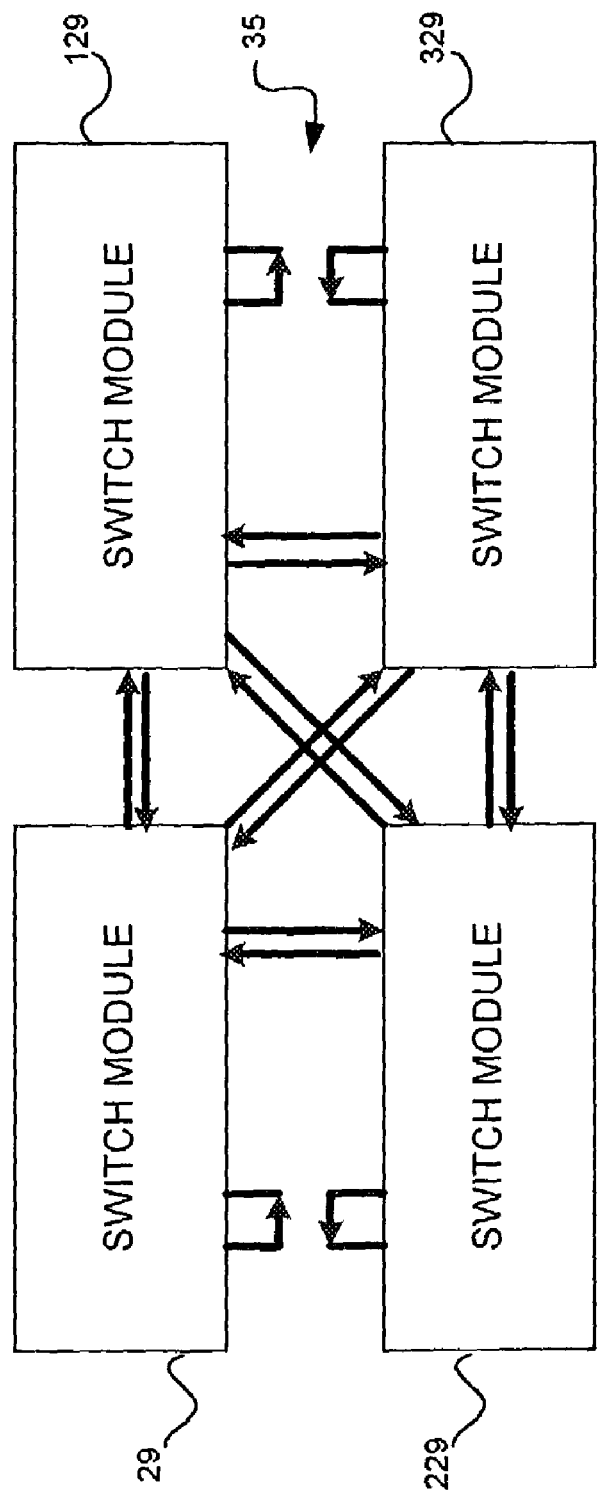
FIG. 6 is a schematic diagram of four switch modules.

FIG. 6 illustrates a possible manner of connecting together four modules 29, 129, 229 and 329 each corresponding to a module 29 as shown in FIG. 1. The four modules are connected so that for each module one mesh link is 'looped back' from a Tx interface 34 to an Rx interface 36, whereas the other links are each connected to an Rx interface in one of the other modules. Alternatively the loop-back may be an internal connection as shown in FIG. 2. The ports of each of the switch modules may be connected to an external network and the four modules in effect constitute a single switch having the aggregate of ports on the modules.

It may be noted that for some purposes not all the mesh links may be used. For example, a switch may be constituted either by a single module or two or three modules.

Figure 7:
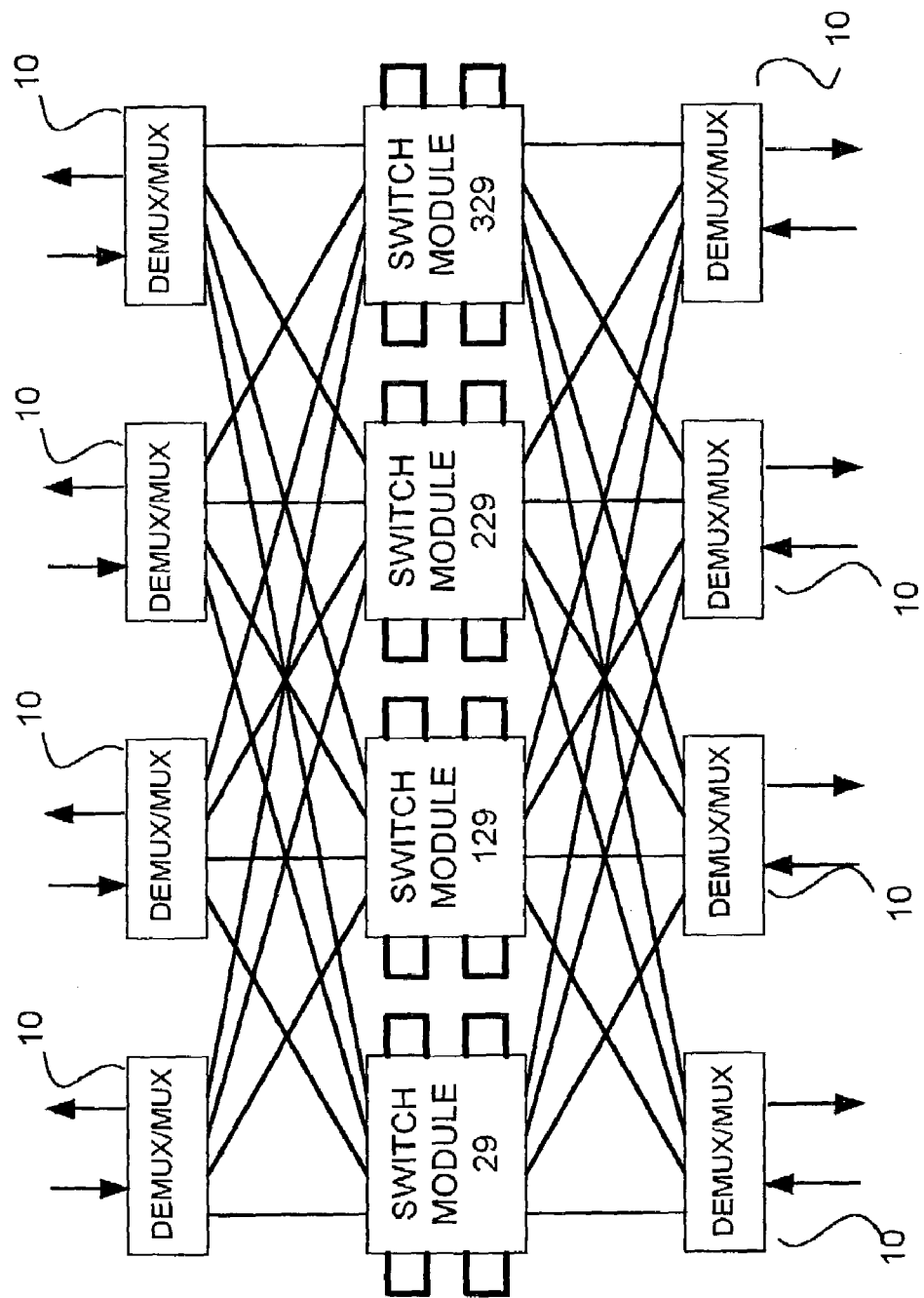
FIG. 7 is a schematic diagram of four switch modules and associated demultiplexer/multiplexers in one configuration in accordance with the invention.

FIG. 7 illustrates a configuration which may employ the same number of switch modules as in FIG. 6 but can inherently provide a greater transmit bandwidth.

In this example, the switch modules 29 etc are associated with demultiplexer/multiplexer units 10 in which there are output lines from each de-multiplexer section of the demultiplexer/multiplexers 10 to the receiving ports of all the switch modules, so that the packets input to each demultiplexer, typically from a high-speed line 11 are distributed among all the switch modules, preferably in a manner which provides an even distribution. Likewise, all the multiplexer sections of the demultiplexer/multiplexers 10 are coupled to receive from 'transmit' ports of all the switch modules 29, 129 etc.

In this architecture, the mesh links of each switch module are all looped-back so that each of the Tx interfaces 34 of a module is connected to a respective Rx interface 36 on the same module.

It will be observed that in the arrangement of FIG. 7, there is no module-to-module traffic. However, other configurations are feasible, and can provide an improvement in transmit bandwidth.

One of the inherent limitations in switches which have mesh links as described previously is the limitation on the transmission bandwidth by virtue of the module-to-module mesh links. In the present invention, the versatility of the modular switch is preserved while allowing configurations wherein the capacity of a mesh link is no longer a limit on the performance of the switch composed of a multiplicity of such modules.

The configurations which have been described in the foregoing illustrate generally not only the versatility of the basic switching module but, indirectly, also indicate its limitations. Basically, they arise because the total available bandwidth through the ports of the switching module is significantly greater than the bandwidth available through a single mesh link. The relationship varies according to the number of ports on each module and the data rate and number of channels for a mesh link, but in any event it is desirable to design the switching modules having regard to the most usually favoured configurations, such as shown in FIG. 6, and as a general rule the total available bandwidth on a single mesh link is about half the aggregate bandwidth of the ports on a switching module.

The bandwidth restriction inherent in the employment of mesh links may, as previously described with reference to FIGS. 6 and 7, be at least partly compensated by the looping back of the mesh links, though this places some constraints on the configurations which may be employed. Furthermore, such configurations tend to require the use of input demultiplexers and multiplexers as described with reference to FIG. 7.

Figure 8:
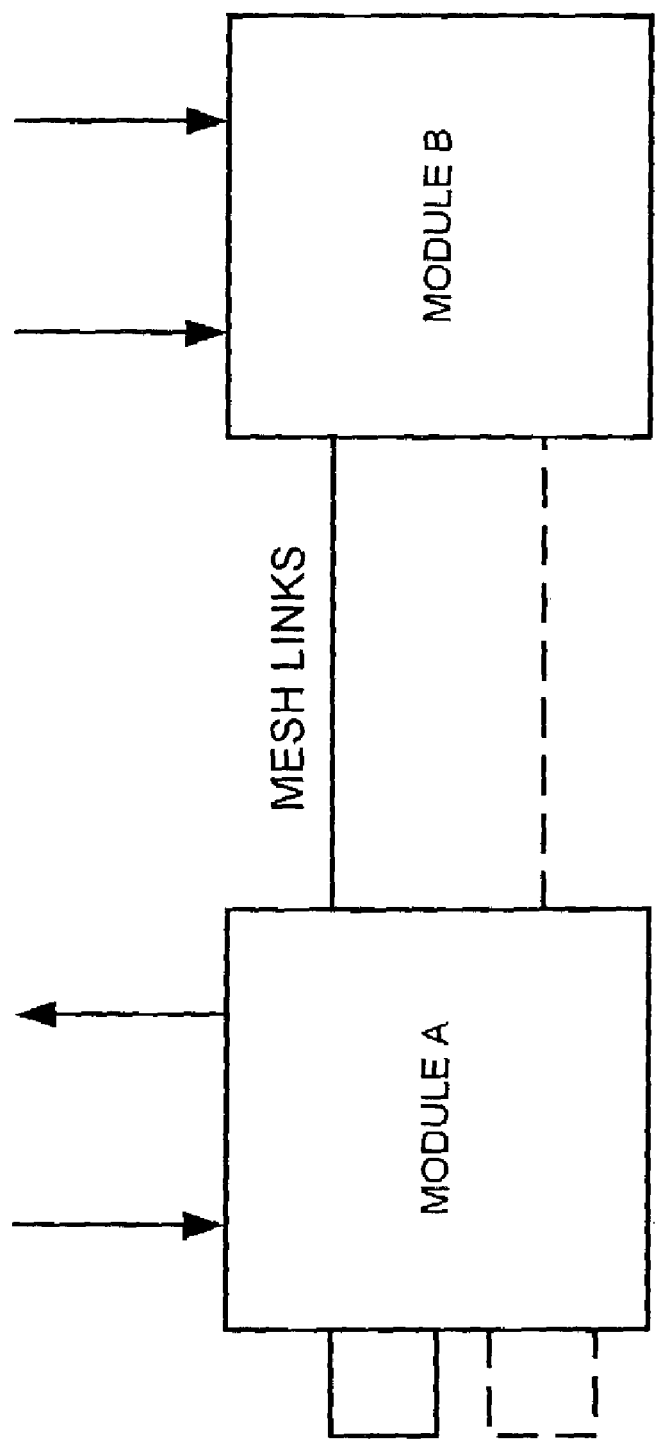
FIG. 8 is a schematic diagram of two switch modules in another configuration in accordance with the invention.

FIG. 8 is a simplified diagram illustrating two switching modules, each implemented on a respective chip, connected together. Each switching module has sixteen ports which in this example may consist of four 2.5 gigahertz ports and twelve 1 gigahertz ports. The total bandwidth which can be received by the chip corresponds to a data rate of 22 gigahertz. Each of the chips, as described previously, has an internal mesh link, as shown in FIG. 2, and three external mesh links. Each of these is typically capable of a data rate of 10 gigahertz. In the arrangement shown in FIG. 8, one mesh link is looped back on each chip and another mesh link connects the two chips. These mesh links are shown in solid line in FIG. 8. The remaining two mesh links, shown in interrupted line, are unused. The disadvantage of this configuration is that the switch modules can be subject to blocking, depending on the distribution of traffic, because, for example, if all the traffic received on the first chip is intended for forwarding by the second chip, the single mesh link is incapable of carrying the same volume of traffic as is available at the ports of the first chip.

Figure 9:
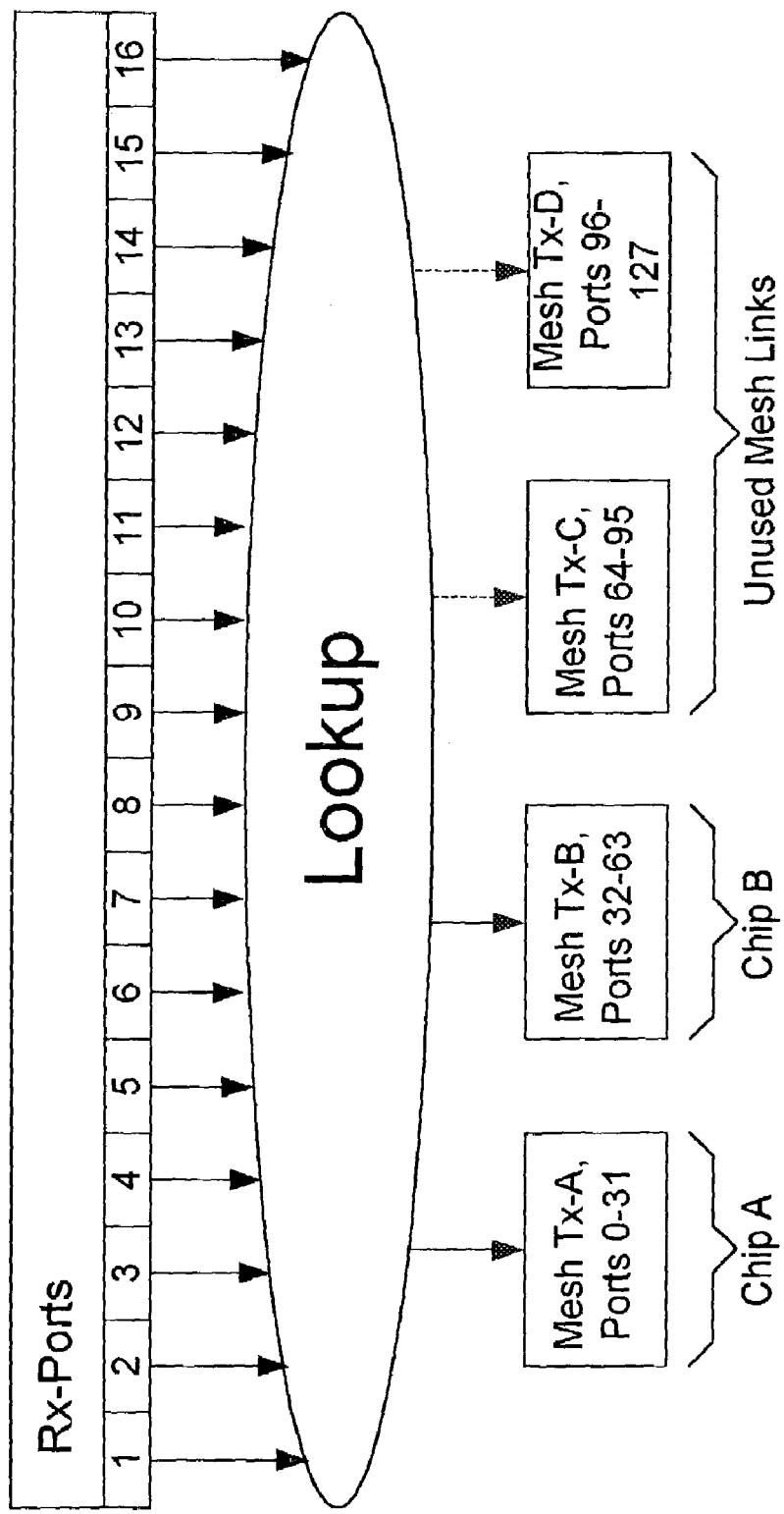
FIG. 9 illustrates a look-up scheme.

FIG. 9 illustrates schematically the receive side processing in a switching module. Packets received on the ports are subjected to a look-up to identify the egress port for the packet. It is customary to allot port numbers to the ports of a chip. For the sake of example, it will be assumed that ports on chip A are numbered, for ingress, 0-31. The ports on the second chip are numbered 32 to 63 and so on. Packets are directed to a mesh link based on their egress port. In such a scheme, packets for transmission from a port of chip A will always be directed to reach chip A by mesh link A and those for ports on chip B will always be directed to chip B via mesh link B. FIG. 9 indicates that packets received on ports 1 to 16 (Port 0 is conventionally a 'management' port) are subjected to a look-up and dispatched to a mesh in accordance with a fixed numbering of the ports.

The significance of FIG. 9 is that the port numbers on a chip are fixedly associated with a mesh link. Thus packets for transmission from chip A will always be directed to mesh link A and packets for transmission from chip B will always be directed to mesh link B and so on.

Figure 10:
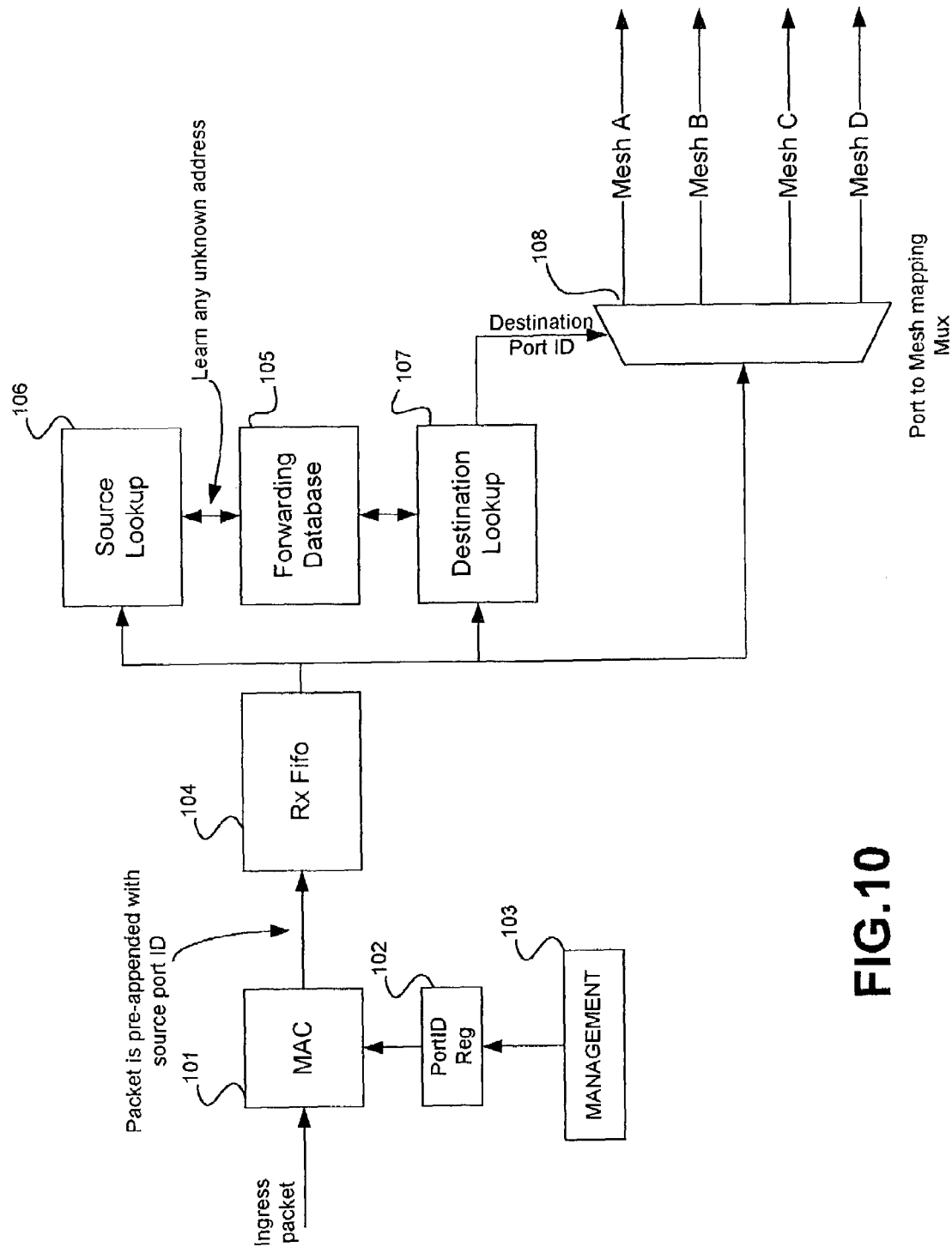
FIG. 10 illustrates a modification to a switch module as shown in FIG. 1 or FIG. 2.

FIG. 10 illustrates the look-up and forwarding process for a packet received at a port of a switch module according to the invention. The process resembles a standard process except for the programmable port numbering and the consequent effect on the mapping of ports to meshes.

A packet received at a port is input to a respective media access control device (MAC) 101. The MAC is linked to a programmable register 102 which stores a port identification number (port ID). The register is shown as subject to a 'management' function 103, which represents either a manual of, if desired, a CPU controlled by means of altering the programmable register. The number may in general be selected as any number in the range for which the switch is designed (typically 0-127). The management means 103 may readily if desired be organised to prevent automatically duplicate allocation of port numbers, though this is not necessary because the port numbers can be programmed at the time of setting up the mesh links and a change during operation is not normally appropriate. As will be soon apparent, each of the ports may have a programmable port ID. The packet proceeds from MAC 101 with its source port ID pre-appended in any suitable manner known in the art. The packet is temporarily stored, in for example a respective Rx FIFO 104, while portions of the packet are subjected to look-up and other conventional processing to determine the destination port for the packet. Lookup may be performed on any selected address data or other suitable data in a packet.

The packet look-up function 32 and the switching function 33 shown in FIG. 1 are represented in simplified form by the forwarding database 105 and the port-to-mesh mapping mux selector 108 in FIG. 10. As is usual, the forwarding database contains entries of addresses and respective egress port numbers. Such a database is usually established at least in part by means of a source address look-up 106 on received packets: thus if a packet has a source address SA and is received at port N, the port number N is 'learnt' against that source address in database 105. Accordingly, if a packet with a destination address DA corresponding to that source address is received, the destination look-up will yield port N as the destination port for that packet. The destination port number (N) controls the selection of the mesh link for that packet by mux selector 108.

The significance of the ability to change the port numbering is that the distribution of packets to the meshes is no longer dependent on which port receives the packets, because the ports can be arbitrarily programmably numbered, and the mesh selection depends on the programmed numbering.

Figure 11:
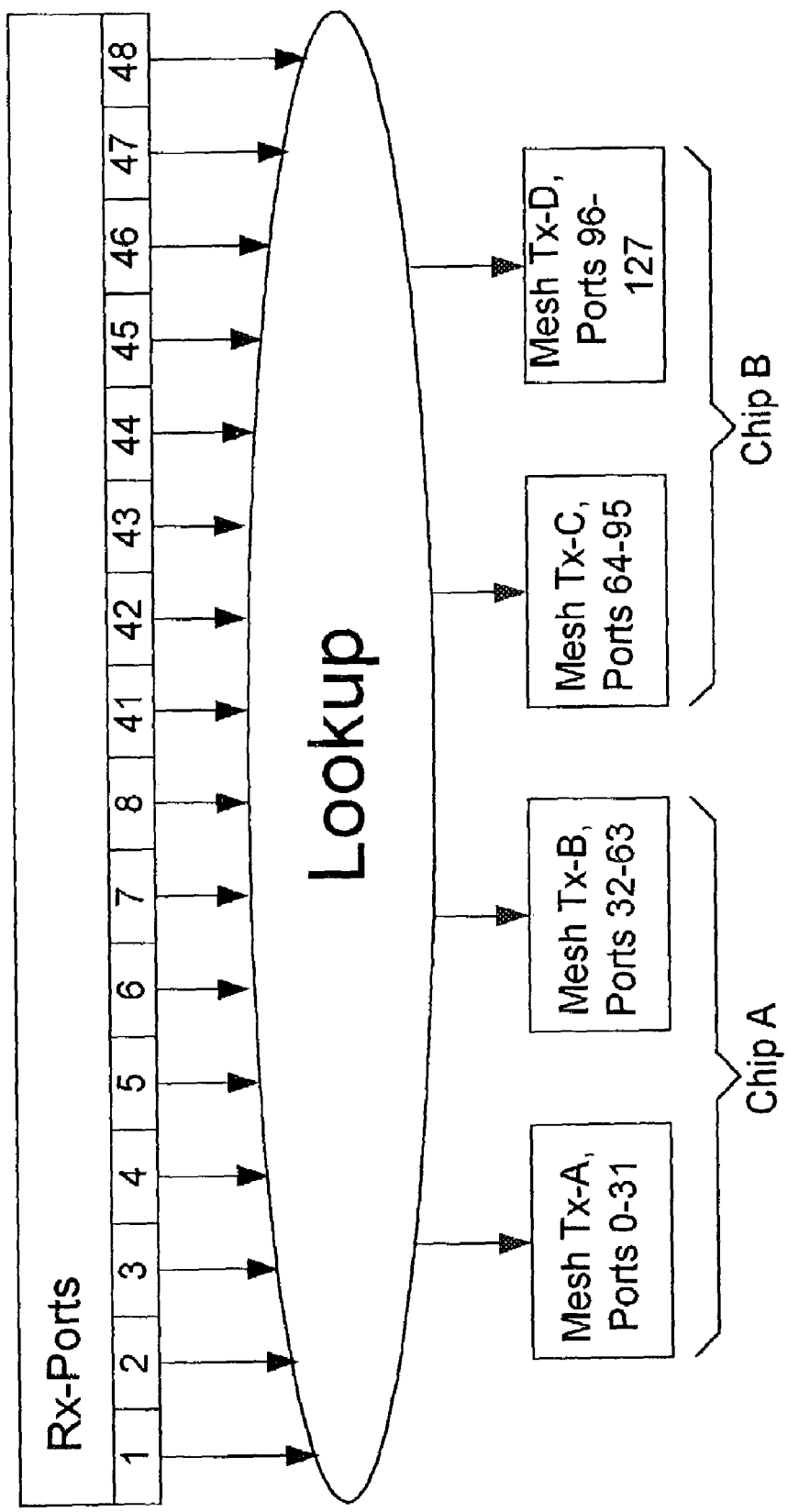
FIG. 11 illustrates another look-up scheme.

An example of the effect of programmable numbering is shown in FIG. 11, wherein ports 9 to 16 have been renumbered as ports 41 to 48. Similarly, ports on chip B might be numbered for example from 65 to 72 and 97 to 104. The advantage of this scheme is that, owing to the inherent relationship between the port numbers and the mesh links, when in chip B there is a look-up and the result is a port on chip A, that is to say any of ports 1 to 8 or 41 to 48, there is in general a distribution of traffic between the mesh links, because packets intended for ports 1 to 8 will appear on mesh link A whereas packets intended for any of ports 41 to 48 will be transmitted on mesh link B.

This facility renders the switch modules substantially more versatile and substantially eases difficulties arising from potentially excess traffic flow on the meshes.

Although the renumbering scheme is shown in relation to two chips, renumbering may be employed in any of the configurations aforementioned either to cope with actual or expected traffic demands.

The invention claimed is:

1. A network switching module comprising:
   (i) a plurality of ports for the reception and forwarding of addressed data packets;
   (ii) a look-up engine for performing a look-up on selected address data in a received addressed data packet to obtain forwarding data including a port number;
   (iii) a switching facility;
   (iv) a multiplicity of output mesh interfaces for the transmission of addressed data packets to at least one other switching module, said switching facility directing an addressed data packet to a selected one of said output mesh interfaces in dependence on the said port number;
   (v) a multiplicity of input mesh interfaces for the reception of addressed data packets from at least said other switching module;
   (vi) means coupling said input mesh interfaces to at least some of said ports; and
   (vii) programmable registers for providing at least some of the ports with selectable port numbers so that the mapping of ports to meshes can be altered.

2. A network switching module according to claim 1 wherein said lookup engine includes a lookup database which associates packet address data with port numbers and provides in response to a received addressed data packet an entry in said database, said entry including the port number of the port on which that addressed data packet has been received and source address data from that addressed data packet, said lookup engine having recourse to said database to determine a destination port number for an addressed data packet having destination address data corresponding to said source address data.

3. A network switching module comprising:
   (i) a plurality of ports for the reception and forwarding of addressed data packets having source address data and destination address data
   (ii) a lookup database which associates source address data with port numbers;
   (iii) a look-up engine for performing in said lookup database a destination look-up on selected destination address data in a received packet to determine for that packet a destination port number when said selected destination address data corresponds to source address data in the look-up database;
   (iv) a switching facility;
   (v) a multiplicity of output mesh interfaces for the transmission of addressed data packets to at least one other switching module, said switching facility directing an addressed data packet to a selected one of said output mesh interfaces in dependence on said destination port number;
   (vi) a multiplicity of input mesh interfaces for the reception of addressed data packets from at least said other switching module;
   (vii) means coupling said input mesh interfaces to at least some of said ports; and
   (viii) registers for providing at least some of the ports with selectable port numbers so that the mapping of ports to meshes can be altered.

4. A network switching module according to claim 3 wherein said lookup engine responds to received addressed packets to establish entries each associating a source address with a port number identifying a port on which a respective addressed packet has been received.

* * * * *